May 23, 1933.  G. E. HULSE  1,909,963
GENERATOR DRIVING APPARATUS
Filed March 25, 1930   2 Sheets-Sheet 1

INVENTOR
George E. Hulse
BY Janney, Blair & Curtis
ATTORNEYS

May 23, 1933.  G. E. HULSE  1,909,963
GENERATOR DRIVING APPARATUS
Filed March 25, 1930  2 Sheets-Sheet 2
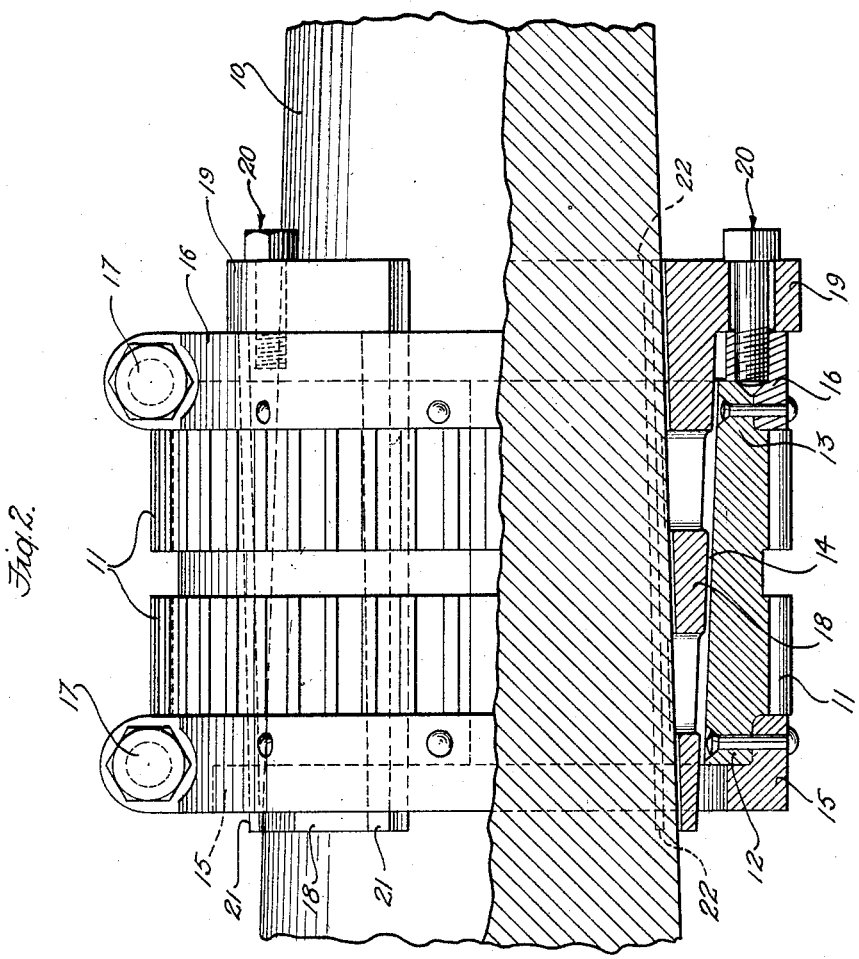

Patented May 23, 1933

1,909,963

UNITED STATES PATENT OFFICE

GEORGE E. HULSE, OF NEW HAVEN, CONNECTICUT, ASSIGNOR TO THE SAFETY CAR HEATING & LIGHTING COMPANY, A CORPORATION OF NEW JERSEY

GENERATOR DRIVING APPARATUS

Application filed March 25, 1930. Serial No. 438,708.

This invention relates to power transmission apparatus, and more specifically to features of such apparatus particularly adapted for use in driving generators from car axles.

One of the objects thereof is to provide practical apparatus of the above nature of simple and secure construction. Other objects are to provide apparatus of the above nature in which the action is dependable and in which the parts are readily assembled and taken apart. Another object is to provide apparatus of the above nature particularly adapted to meet effectively the severe conditions of construction and use inherent in driving from car axles. Other objects will be in part obvious or in part pointed out hereinafter.

The invention accordingly consists in the features of construction, combinations of elements, and arrangements of parts, as will be illustratively described herein, and the scope of the application of which will be indicated in the following claims.

In the accompanying drawings, in which is shown one of various possible embodiments of this invention, Figure 1 is an end view of parts mounted upon a car axle;

Fig. 2 is a longitudinal section taken substantially along the line 2—2 of Fig. 1;

Similar reference characters refer to similar parts throughout the several figures of the drawings.

Figure 1:
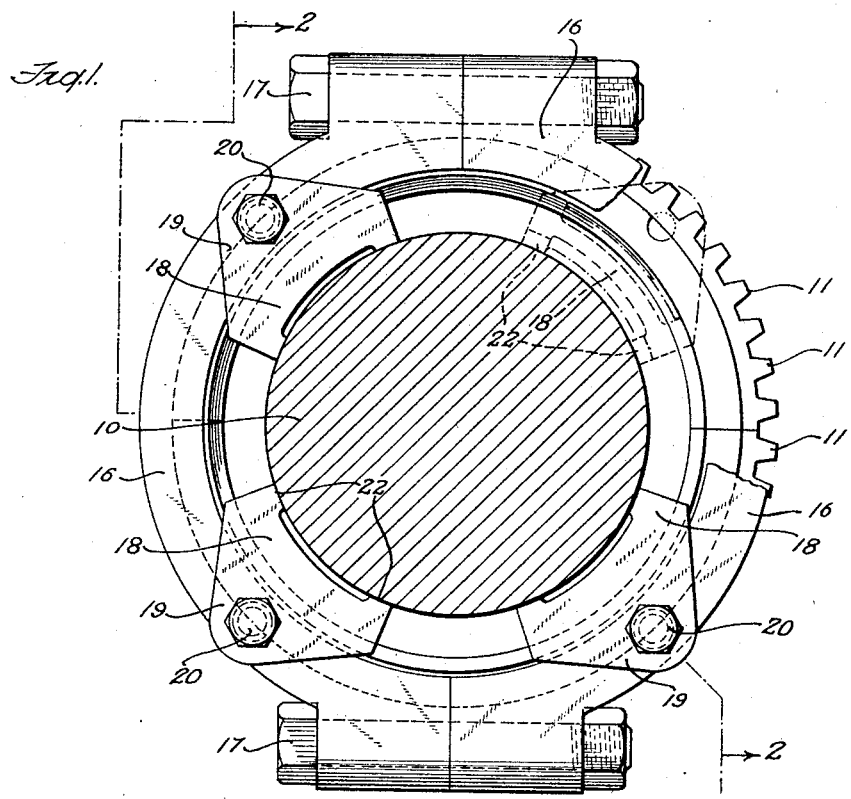

Having reference now to this embodiment, there is shown at 10 a portion of a car axle, which may be generically referred to as a shaft. It may here be noted that the term "shaft" is used throughout in a broad sense to denote any rotatable member adapted to carry another to rotate therewith. The member 10 is shown as of the tapering form common to car axles, which conformation increases the difficulties in securely and practically mounting rotary members thereon.

At 11 is a sprocket wheel or gear split along a radial plane into two parts and so formed that when assembled they combine to provide a gear or sprocket member in which the proper pitch distance between the teeth is maintained entirely about the circumference. The member 11 (see Fig. 2) is provided with a pair of circumferential shoulders 12 and 13 and is tapered about its inner surface 14 in a direction opposite to the taper of the axle 10. Respectively embracing the shoulders 12 and 13 are a pair of split collars 15 and 16 each formed in two parts, as best shown in Fig. 2 of the drawings, and each held tightly in assembled relation, as by the bolts 17. It is to be understood that the collars 15 and 16 are so proportioned that when the several bolts 17 are tightened, the parts of the sprocket member 11 are so firmly clamped together as to remain virtually as one piece in use. Thus the opposite surfaces of the shoulders 12 and 13 and the collars 15 and 16 respectively may be tapered at opposite angles to form an interlock therebetween, or these parts may be secured together by rivets as is found convenient in the preferred embodiment of my invention.

Interposed between the inner surface 14 of the sprocket and the outer oppositely tapering surface of the axle 10 are a plurality of equally spaced wedge members 18. These members are here shown as four in number and are so proportioned as to subtend in the aggregate the major portion of the surface of the axle 10 in a circumferential direction. In other words, they are preferably so disposed and formed that the space between adjacent members is less than the space which they cover. As these members are substantially identical one with another, one only will be described in detail.

Figure 3:
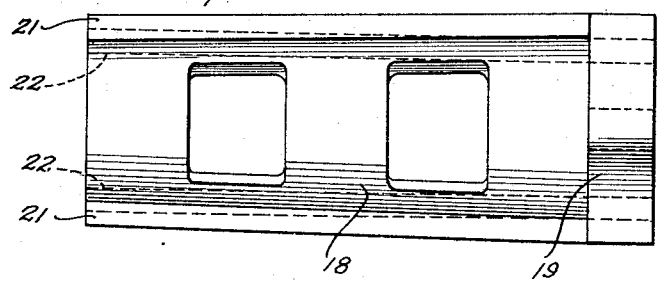
Fig. 3 is a plan of a securing device.
Figure 5:
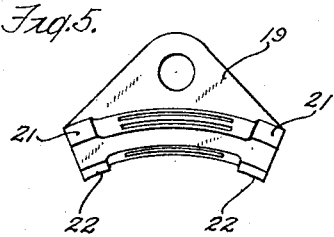
Fig. 5 is an end view of the parts shown in Figs. 3 and 4.
Figure 4:
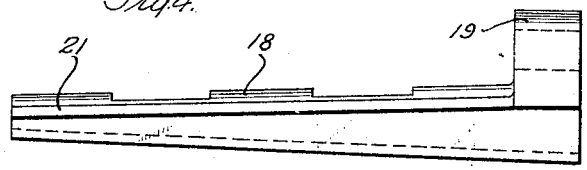
Fig. 4 is a side elevation of the device shown in Fig. 3.

Referring now to the construction of the members 18, the details of which are shown in Figs. 3, 4 and 5 of the drawings, it is noted that each is provided with an outwardly extending lug 19 through which passes a machine screw 20 into the collar 15 or other part of the outer rotary device. The inner and outer surfaces of the member 18 taper in opposite directions longitudinally thereof in such manner that when fitted between the inner surface 14 of the sprocket and the outer surface of the axle, the plane of rotation of the former will be perpendicular to the centerline of the axle.

The outer surface of the member 18, moreover, is provided with a pair of spaced bearing surfaces 21, and its inner surface with a pair of spaced bearing surfaces 22. By this disposition of the bearing surfaces, slight imperfections, particularly in the outer surface of the axle, are prevented from interfering with closeness of fit with the wedge members 18. Furthermore, the pressure is localized and thereby intensified so as to make a more secure contact and lessen any effect of dirt or other foreign matter on the parts with which these surfaces engage.

In action, the collars and sections of the sprocket member are assembled as above noted, and the latter is positioned at the desired point longitudinally of the axle. The wedges 18 are then drawn home by means of the screws 20, and by their aggregate effect mount the sprocket precisely at right angles to the centerline of the axle and concentrically disposed with respect thereto. It will be seen that the concentricity may be corrected by a proper longitudinal positioning of the wedges, and that the conformation of the latter avoids any tendency to distortion of the sprocket out of its true circular form. This arrangement, furthermore, even under the severe conditions of use of a railway axle and a wide range of variation in temperature, prevents any loosening of the sprocket, although, if it is desired to remove it, this is readily done, as, for example, by opening up the split collars 15 and 16.

It will thus be seen that there is provided apparatus in which the several objects of this invention are achieved and that this apparatus is not only essentially workable and practical, but can be depended upon to remain in efficient action under conditions of long-continued use.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim:

1. In power transmission apparatus, in combination, a shaft, an outer member divided into sections, means encircling said sections of said outer member to hold said sections in assembled relation about said shaft, a plurality of spaced members interposed between said outer member and said shaft, and means securing said spaced members to said encircling means.

2. In power transmission apparatus, in combination, a shaft, an outer member divided into sections, a pair of collars adapted to hold said sections in assembled relation about said shaft, a plurality of members wedged between said outer member and said shaft, and means adapted to secure said interposed members to one of said collars.

3. In power transmission apparatus, in combination, a tapering shaft, an outer member divided into two circumferential sections, means adapted to hold the sections of said outer member in assembled relation about said shaft, said outer member having its inner surface tapering in a direction opposite to that of the shaft, and wedge members substantially spaced about said shaft both surfaces of which taper to fit the inner surface of the outer member and the outer surface of the shaft, said wedge members being secured to said holding means.

4. In power transmission apparatus, in combination, a tapering shaft, an outer member divided into two circumferential sections, means adapted to hold the sections of said outer member in assembled relation about said shaft, said outer member having its inner surface tapering in a direction opposite to that of the shaft, wedge members both surfaces of which taper to fit the inner surface of the outer member and the outer surface of the shaft, each of said wedge members having thereon circumferentially spaced bearing surfaces, and means connecting said wedge members to said holding means.

5. In power transmission apparatus, in combination, a shaft, a driving member including a plurality of sections extending about said shaft, a member encircling said sections to hold said sections in position about said shaft, a plurality of wedge members interposed between said shaft and said sections, and bolts extending through said wedge members and threaded into said encircling member.

6. In power transmission apparatus, in combination, a shaft, a driving part including a plurality of sections disposed about the circumference of said shaft, a member encircling said sections to hold said sections in position about said shaft, a plurality of wedge members interposed between said driving part and said shaft and having portions extending radially into substantial registry with said encircling member, bolts extending through said last-mentioned portions and threaded into said encircling member to draw said wedge members into operative position, and means connecting said encircling member with said sections.

7. In power transmission apparatus, in combination, a shaft, a driving part including a plurality of sections disposed about the circumference of said shaft, a member encircling said sections to hold said sections in position about said shaft, a plurality of wedge members interposed between said shaft and said sections, said wedge members having substantially spaced bearing surfaces in engagement with said shaft, and means connecting said wedge members with said encircling member.

8. In power transmission apparatus, in combination, a shaft, a driving part including a plurality of sections disposed about the circumference of said shaft, a member encircling said sections to hold said sections in position about said shaft, a plurality of wedge members interposed between said shaft and said sections, said wedge members having substantially spaced bearing surfaces in engagement with said shaft, means connecting said encircling member with said sections, and means securing said wedge members to said encircling member.

9. In power transmission apparatus, in combination, a shaft, a driving member comprising a plurality of individual sections disposed about the circumference of said shaft, a collar member comprising two parts encircling said sections, a plurality of wedge members interposed between said sections and said shaft, means connecting said parts to grip said sections into position, and means connecting said wedge members with said encircling collar.

10. In power transmission apparatus, in combination, a shaft, a driving member comprising a plurality of individual sections disposed about the circumference of said shaft, a collar member comprising two parts encircling said sections, a plurality of wedge members interposed between said sections and said shaft, means connecting said parts to grip said sections into position, said encircling collar being secured to said sections, and bolts extending through portions of said wedge members and threaded into said encircling collar.

11. In power transmission apparatus, in combination, a shaft, a driving member comprising a plurality of circumferential sections disposed about said shaft, a plurality of wedge members interposed between said sections and said shaft, said wedge members having substantially spaced bearing surfaces contacting said shaft, a pair of collar members encircling said driving member substantially at its opposite ends, means for securing said collar members to said sections, said wedge members having radially extending portions at one end thereof, and bolts extending through said radially extending portions and threaded into said collar members.

12. In power transmission apparatus, in combination, a shaft, a driving member comprising a plurality of circumferential sections disposed about said shaft, a plurality of wedge members interposed between said sections and said shaft, said wedge members having substantially spaced bearing surfaces contacting said shaft, a pair of collar members encircling said driving member substantially at its opposite ends, said collar members being divided into individual parts, bolts extending through the opposite ends of said parts to grip said collar members about said sections, means for securing said collar members to said sections, said wedge members having radially extending portions at one end thereof, and bolts extending through said radially extending portions and threaded into said collar members.

In testimony whereof, I have signed my name to this specification this 12th day of March, 1930.

GEORGE E. HULSE.